(12) United States Patent
Fang

(10) Patent No.: US 10,606,457 B2
(45) Date of Patent: Mar. 31, 2020

(54) SHAKE EVENT DETECTION SYSTEM

(71) Applicant: Google Inc., Mountain View, CA (US)

(72) Inventor: Jingyi Fang, San Jose, CA (US)

(73) Assignee: Google LLC, Mountain View, CA (US)

( * ) Notice: Subject to any disclaimer, the term of this patent is extended or adjusted under 35 U.S.C. 154(b) by 227 days.

(21) Appl. No.: 15/290,021

(22) Filed: Oct. 11, 2016

(65) Prior Publication Data

US 2018/0101293 A1  Apr. 12, 2018

(51) Int. Cl.

| | |
|---|---|
| *G06F 3/0484* | (2013.01) |
| *G06F 1/16* | (2006.01) |
| *G06F 3/01* | (2006.01) |
| *G06F 3/0481* | (2013.01) |
| *G06T 15/20* | (2011.01) |
| *G06T 17/05* | (2011.01) |
| *G06T 19/00* | (2011.01) |

(52) U.S. Cl.
CPC ........ *G06F 3/04845* (2013.01); *G06F 1/1694* (2013.01); *G06F 3/017* (2013.01); *G06F 3/04815* (2013.01); *G06F 3/04817* (2013.01); *G06T 15/20* (2013.01); *G06T 17/05* (2013.01); *G06T 19/003* (2013.01)

(58) Field of Classification Search
CPC .... G06F 3/04845; G06F 1/1694; G06F 3/017; G06T 15/20; G06T 17/05; G06T 19/003
See application file for complete search history.

(56) References Cited

U.S. PATENT DOCUMENTS

| | | | |
|---|---|---|---|
| 5,404,458 A | 4/1995 | Zetts | |
| 5,583,984 A | 12/1996 | Conrad et al. | |
| 5,598,187 A | 1/1997 | Ide et al. | |
| 6,573,883 B1 | 6/2003 | Bartlett | |
| 6,834,249 B2 | 12/2004 | Orchard | |
| 7,180,501 B2 | 2/2007 | Marvit et al. | |
| 7,397,500 B2 | 7/2008 | Yost et al. | |
| 7,649,536 B1 | 1/2010 | Eng | |
| 7,952,561 B2 | 5/2011 | Liu et al. | |
| 8,159,457 B2 | 4/2012 | Coe | |
| 8,203,528 B2 | 6/2012 | Spalink | |
| 9,086,741 B2 | 7/2015 | Helmes et al. | |

(Continued)

FOREIGN PATENT DOCUMENTS

JP  5980404  8/2016

OTHER PUBLICATIONS

International Search Report for PCT/US2017/052071 dated Dec. 27, 2017, 8 pages.

(Continued)

*Primary Examiner* — Roland J Casillas

(74) *Attorney, Agent, or Firm* — Dority & Manning, P.A.

(57) ABSTRACT

Systems, apparatuses, and methods for performing a user interface action are provided. In one embodiment, an example method includes receiving, by one or more computing devices, data indicative of a user input directed to causing a motion of a virtual camera associated with a user interface. The method further includes detecting, by the one or more computing devices, a shake event associated with the user interface based at least in part on the motion of the virtual camera. The method further includes performing, by the one or more computing devices, an action associated with the user interface based at least in part on the detected shake event.

20 Claims, 9 Drawing Sheets

(56) References Cited

U.S. PATENT DOCUMENTS

| | | | |
|---|---|---|---|
| 9,235,765 B2 | 1/2016 | Bentley et al. | |
| 9,310,890 B2 | 4/2016 | Brewer | |
| 2004/0246240 A1 | 12/2004 | Kolmykov-Zotov et al. | |
| 2005/0052406 A1 | 3/2005 | Stephanick et al. | |
| 2005/0212766 A1 | 9/2005 | Reinhardt et al. | |
| 2006/0012571 A1* | 1/2006 | Rodgers | G06F 3/012 345/157 |
| 2006/0209014 A1 | 9/2006 | Duncan et al. | |
| 2006/0236005 A1 | 10/2006 | His | |
| 2007/0125852 A1* | 6/2007 | Rosenberg | G11B 5/5582 235/435 |
| 2007/0145680 A1 | 6/2007 | Rosenberg | |
| 2009/0226157 A1* | 9/2009 | Uenaka | G03B 17/00 396/55 |
| 2010/0020244 A1* | 1/2010 | Mitsuya | H04N 5/23248 348/699 |
| 2010/0070926 A1* | 3/2010 | Abanami | G06F 1/1626 715/835 |
| 2011/0061029 A1 | 3/2011 | Yeh et al. | |
| 2012/0223936 A1* | 9/2012 | Aughey | G06F 3/04815 345/419 |
| 2012/0327125 A1 | 12/2012 | Kutliroff et al. | |
| 2013/0321401 A1 | 12/2013 | Moore et al. | |
| 2013/0321402 A1* | 12/2013 | Moore | G01C 21/3611 345/419 |
| 2014/0019917 A1* | 1/2014 | Piemonte | G06F 3/017 715/848 |
| 2014/0344687 A1 | 11/2014 | Durham et al. | |
| 2014/0359510 A1* | 12/2014 | Graf | G01C 21/3667 715/771 |
| 2015/0089419 A1* | 3/2015 | Hwang | G06F 3/017 715/768 |
| 2015/0113429 A1* | 4/2015 | Edwards | H04L 67/10 715/746 |
| 2017/0153709 A1 | 6/2017 | Kondo | |

OTHER PUBLICATIONS

Graveleau et al., "A Head-Controlled User Interface", Proceedings of the 8th International Conference on Humans and Computers, Aug. 31-Sep. 2, 2005, Aizu-Wakainatsu, Japan, pp. 306-311.

Lynch, "OS X El Capitan: Find Your Cursor by Shaking Your Mouse or Trackpad", http://www.cio.com/article/2976563/os-x/os-x-el-capitan-find-your-cursor-by-shaking-your-mouse-or-trackpad.html, retrieved on Aug. 22, 2016. 2 pages.

Posey, "Examining the New Windows 7 User Interface", www.windowsnetworking.com, retrieved on Aug. 22, 2016—4 pages.

Starrett, "iPhone Gems: Every Drawing Application, Reviewed", http://www.ilounge.com/index.php/articles/comments/iphone-gems-every-drawing-application-reviewed/, retrieved on Aug. 22, 2016—16 pages.

Thurrott, "Windows 7 Feature Focus: Acre Shake", http://winsupersite.com/article/windows-7/windows-7-feature-focus-aero-shake, retrieved on. Aug. 23, 2016, 3 pages.

* cited by examiner

SHAKE EVENT DETECTION SYSTEM

FIELD

The present disclosure relates generally to user interactions with a user interface, and more particularly to performing a user interface action upon detection of a shake event associated with the user interface.

BACKGROUND

User devices can include motion sensors to detect movement associated with the device. For instance, a mobile phone may include an accelerometer that is configured to detect the movement of the mobile phone. In some cases, the movement detected by the accelerometer can be used to perform a task associated with the device. For example, a software application may scroll to the next song in a playlist after the accelerometer detects movement of the mobile device. However, repeated movement of a device can increase the risk of potential damage to the device. Moreover, inclusion of such motion sensors can increase hardware cost, while also using valuable processing and power resources.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of performing a user interface action. The method includes receiving, by one or more computing devices, data indicative of a user input directed to causing a motion of a virtual camera associated with a user interface. The method includes detecting, by the one or more computing devices, a shake event associated with the user interface based at least in part on the motion of the virtual camera. The method includes performing, by the one or more computing devices, an action associated with the user interface based at least in part on the detected shake event.

Another example aspect of the present disclosure is directed to a computing system for performing a user interface action. The computing system includes one or more processors and one or more memory devices. The one or more memory devices store instructions that when executed by the one or more processors cause the one or more processors to perform operations. The operations include receiving data indicative of a user input directed to causing a motion of a virtual camera associated with a user interface. The operations include identifying one or more virtual camera manipulation patterns associated with the virtual camera based at least in part on the user input. The operations include detecting a shake event associated with the user interface based at least in part on the virtual camera manipulation patterns. The operations include performing an action associated with the user interface based at least in part on the detected shake event.

Yet another example aspect of the present disclosure is directed to a user device including a display device, one or more processors, and one or more memory devices. The one or more memory devices store instructions that when executed by the one or more processors cause the one or more processors to perform operations. The operations include presenting a user interface via the display device. The operations include receiving data indicative of a user input directed to causing a motion of a virtual camera associated with the user interface. The operations include detecting a shake event associated with the user interface based at least in part on the motion of the virtual camera. The operations include performing an action associated with the user interface based at least in part on the detected shake event.

Other example aspects of the present disclosure are directed to systems, methods, apparatuses, tangible, non-transitory computer-readable media, user interfaces, memory devices, and electronic devices for providing performing a user interface action.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
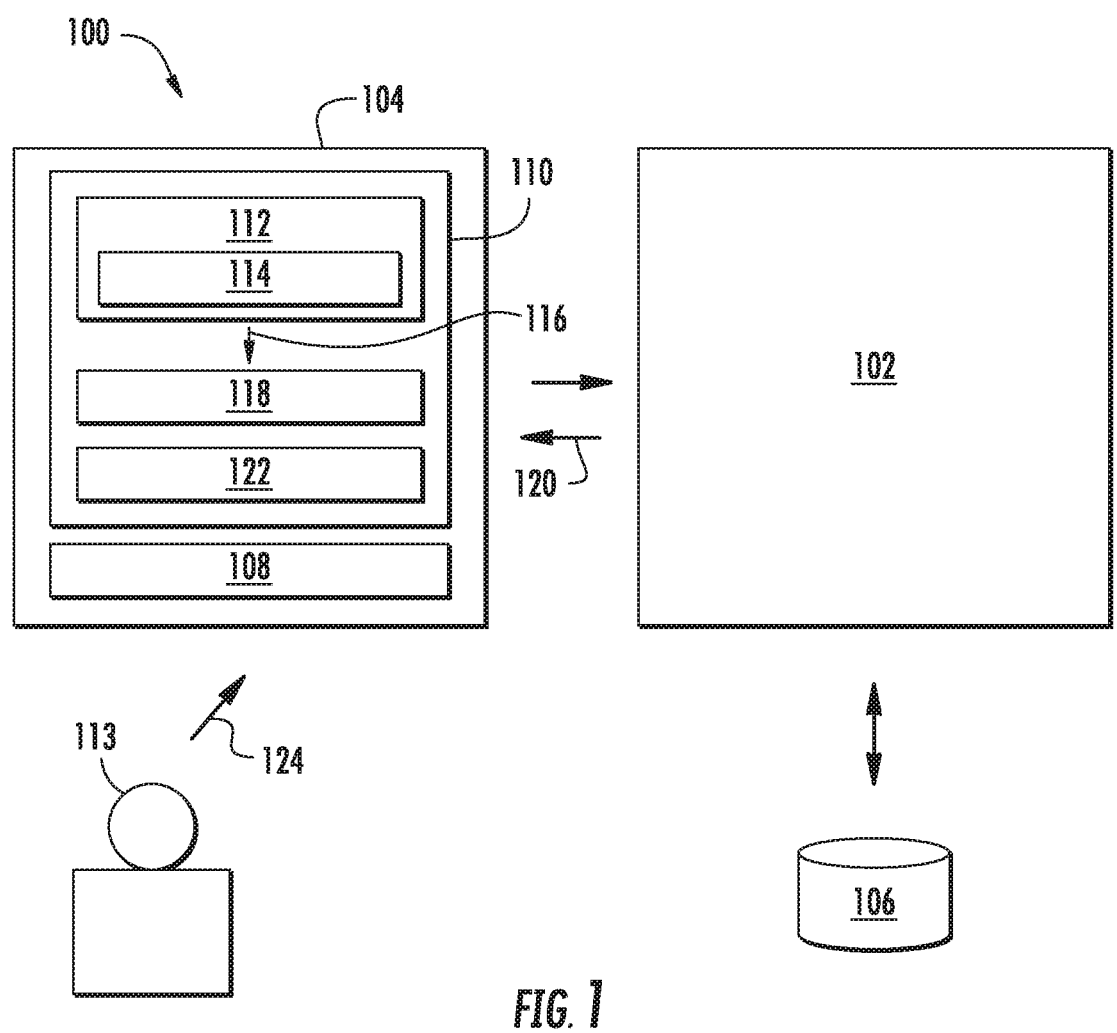
FIG. 1 depicts an example system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to performing a user interface action due to the detection of a shake event directed to the user interface. For instance, a user device can present a user interface for display via a display device. The user interface can be, for example, a rendering of a three-dimensional geographic map user interface (e.g., Google Maps, Google Earth). To interact with the user interface, a user can provide user input directed to a virtual camera that dictates the view being presented within the user interface. For example, a user can grab and drag the map interface via a cursor to manipulate the motion of the virtual camera to show different geographic areas within the user interface. The user device can monitor the virtual camera manipulation patterns to help detect the occurrence of a shake event, whereby the user input causes the motion of the virtual camera to "shake" (e.g., in a side-to-side manner, up-and-down manner, circular manner). The user input can create a shake event simply by interacting with the user interface, rather than physically moving the user device itself to trigger physical motion sensors (e.g., accelerometers, gyroscopes). When the user device detects a shake event, the user device can perform an action associated with the user interface. For example, the user device can remove place location identifiers (e.g., pins) currently displayed on the geographic map interface. In this way, the user device can perform actions based on intuitive user inputs directed to an interface's virtual camera, without using physical motion sensors.

More particularly, a user device can present a user interface (e.g., via a display device) for a user of the user device. The user device can include a laptop computer, a desktop computer, a tablet, a phone, etc. In some implementations, the user device can be associated with a virtual reality system (e.g., a virtual reality headset). The user interface can include, for example, a rendering of a three-dimensional map interface. In some implementations, the map interface can include one or more place location identifier(s) such as icons, pins, arrows, etc. that designate one or more location(s) on the map interface. For instance, the map interface can include an icon that indicates the location of a corporate headquarters office. Additionally, and/or alternatively, the map interface may present information associated with that location via an element (e.g., information card) overlaid the map interface.

The user interface can be associated with a virtual camera that allows a user to navigate and control the view presented in the user interface. For example, a user can navigate through a three-dimensional environment presented by the user interface to display three-dimensional data. The three-dimensional environment can include a virtual camera that defines what three-dimensional data to display. The virtual camera can have a perspective according to its position and/or orientation. By changing the position, orientation, zoom, etc. of the virtual camera, a user can navigate through the three-dimensional environment presented by the user interface. By way of example, the three-dimensional environment can include a substantially spherical three-dimensional model of the Earth (e.g., rendered using satellite and/or other imagery). The user device can receive data indicative of a user input directed to causing a motion of the virtual camera associated with the user interface. For instance, the user input can grab and drag the user interface (e.g., via a cursor) to cause motion of the virtual camera. In this way, the virtual camera can be manipulated to view the spherical three-dimensional model of the Earth from different perspectives.

The user device can monitor the motion of the virtual camera to detect a shake event associated with the user interface. The user device can, for instance, monitor the motion of the virtual camera to detect certain manipulation patterns. By way of example, the user device can determine the occurrence of a plurality of cycles associated with the motion of the virtual camera. A cycle can include a repetitive manipulation pattern that is indicative of the user attempting to create a shake event. This can include side-to-side motion, up-and-down motion, a circular motion, etc. The motion path does not need to be perfectly linear or circular, as long as the motion is indicative of a shaking (of the virtual camera) by the user input.

In some implementations, to detect a cycle, the user device can compare parameter(s) (e.g., x-y-z coordinates, latitude-longitude-altitude) of the virtual camera at a first position (e.g., when the motion starts) to parameters (e.g., x-y-z coordinates, latitude-longitude-altitude) of the virtual camera at subsequent positions. This can allow the user device to determine if the virtual camera is moving in a manner that returns the virtual camera to its initial position, which can be indicative of a cycle. The user device can detect the periodicity of the camera movements and count the number of cycles until it exceeds a threshold level of cycles that is indicative of a shake event. The threshold level of cycles can be set such that inadvertent movements of the virtual camera (e.g., during a bumpy train ride) will not be detected as a shake event.

The user device can perform an action associated with the user interface based, at least in part, on the detected shake event. For example, upon detection of a shake event, the user device can remove one or more place location identifier(s) shown in a geographic map interface. Additionally, and/or alternatively, the user device can remove one or more elements (e.g., information cards) that are overlaid the user interface based, at least in part, on the detected shake event. In some implementations, the user device can clear one or more search result(s) shown in the user interface. For example, upon detection of a shake event, the user device can clear restaurant search results that were input by the user when searching for a particular genre of restaurant. In some implementations, the action can include adjusting the size of the user interface (e.g., to enter/exit full screen mode). Accordingly, the user can manipulate the information and/or characteristics of the user interface by providing input to shake the virtual camera of the user interface.

The systems, methods, and apparatuses described herein may provide a number of technical effects and technical benefits. For instance, by allowing a user to provide a shake event directed to a virtual camera, a user device may provide an efficient and intuitive means for the user to cause an action to take place within a user interface. This may reduce the number of user inputs required by the user to perform certain actions (e.g., removing icons, elements, search results, enter/exit full screen) and so may reduce the amount of processing associated with handling the user inputs. Additionally, as a result of the reduced number of inputs and the intuitive nature the shake event, the user may be able to spend less time using the application associated with the user interface, which may reduce screen-on time, thereby reducing power usage.

Moreover, detecting shake events through analysis of virtual camera update patterns is a superior approach to detecting such events through more basic sensors such as touch inputs and inertia sensor inputs. For example, the systems, methods, and apparatuses described herein can be built on top of existing functionalities that convert touch/inertia-sensor inputs to camera updates. This can allow the systems, methods, and apparatuses described herein to be incorporated across different hardware inputs and platforms (e.g., shaking via touchscreen, shaking virtual reality headsets via inertia-sensors).

The systems, methods, and apparatuses of the present disclosure provide an improvement to user device computing technology by enabling a user device to save computational resources that may otherwise be used by physical motion sensors to detect a shake event. For example, the computing devices described herein can receive data indicative of a user input directed to causing a motion of a virtual camera associated with a user interface, detect a shake event associated with the user interface based, at least in part, on the motion of the virtual camera, and perform an action associated with the user interface based, at least in part, on the detected shake event. In this way, the systems, methods, and apparatuses of the present disclosure can detect a shake event using the motion of the virtual camera, without the use of physical motion sensors. In some cases, this can allow physical motion sensors (e.g., accelerators, gyroscopes) to be omitted from the user device hardware, thereby preserving the processing and power resources (and cost) that would be used on such sensors. In cases where physical motion sensors are still included in the user device, the systems, methods, and apparatuses of the present disclosure can allow these sensors to focus on other, more suitable applications (e.g., for geo-location services), rather than be used for detecting shake events. This can reduce the amount of computational resources allocated to such resource-needy hardware, as well as reduce the need to physically shake the user device (helping to prevent potential damage).

With reference now to the FIGS., example embodiments of the present disclosure will be discussed in further detail. FIG. 1 depicts an example system 100 for performing a user interface action according to example embodiments of the present disclosure. The system 100 can include a provider computing system 102 and one or more user device(s) 104. The provider system 102 and the user device(s) 104 can be interconnected via a direct connection and/or can be coupled via one or more communications network(s), such as a LAN, WAN, the Internet, etc., which may be wired and/or wireless and/or can include any number of wired and/or wireless communication links.

The provider system 102 can be associated with, for example, a mapping service provider such as, Google Maps or Google Earth developed by Google Inc. (Mountain View, Calif.), other suitable geographic services, and/or another an entity that provides data to be rendered in a user interface. In some implementations, the provider system 102 can be associated with a three-dimensional body to be displayed (e.g., architect, building owner, government entity). The provider system 102 can include various components for performing various operations and functions as described herein. For instance, the provider system 102 can include one or more computing device(s) (e.g., servers). As will be further described herein, the provider system 102 can include one or more processor(s) and one or more memory device(s). The one or more memory device(s) can store instructions that when executed by the one or more processor(s) cause the one or more processor(s) to perform operations and functions. The provider system 102 can be coupled to and/or can include various databases, such as a database 106. The database 106 can include data (e.g., geographic data) that is accessible by the provider system 104. The computing device(s) 108 can provide various data from the database 106 to the user device(s) 104 via one or more network(s).

A user device 104 can be various types of user devices, such as, a tablet, a personal digital assistant (PDA), a laptop computer, a desktop computer, a phone, a smart phone, a computerized watch (e.g., a smart watch), computerized eyewear, computerized headwear, other types of wearable computing devices, a gaming system, a media player, an e-book reader, a television platform, a navigation system, an embedded computing device, and/or any other type of mobile and/or non-mobile computing device. The user device 104 can include various components for performing various operations and functions as described herein. For instance, the user device 104 can include a display device 108 and one or more computing device(s) 110. The display device 108 can include an output device configured to display a user interface, such as a CRT, LCD, plasma screen, touch screen, TV, projector, etc. As will be further described herein, the computing device(s) 110 can include one or more processor(s) and one or more memory device(s). The one or more memory device(s) can store instructions that when executed by the one or more processor(s) cause the one or more processor(s) to perform operations and functions, for example, such as those described herein for performing a user interface action.

The computing device(s) 110 can include various components for implementing a user interface. The computing device(s) 110 can include a camera component 112 (e.g., camera manipulation system) that is configured to receive data indicative of a user input (e.g., raw input data) from a user 113 and generate an output based, at least in part on the input data. For example, the camera component 112 can be associated with a virtual camera 114 that can be used to navigate within a user interface (e.g., such as that shown in FIG. 2A). The virtual camera 114 can have a perspective according to its position and/or orientation. By changing the position, orientation, zoom, etc. of the virtual camera 114, a user can navigate through an environment presented by a user interface. By way of example, the user interface can be a geographic map interface that presents a three-dimensional environment. In some implementations, the three-dimensional environment can include a substantially spherical three-dimensional model of the Earth (e.g., rendered using satellite imagery and/or other imagery). The camera component 112 can receive data indicative of a user input directed to causing a motion of the virtual camera 114 so that the user can navigate the environment of the user interface (e.g., to see different views, orientations, positions, locations). The camera component 112 can process the data indicative of the user input and generate an output 116 based, at least in part, on that data. The output 116 can be indicative of one or more conditions(s) that define the camera (e.g., location conditions, orientation conditions). The camera component 112 can provide the output 116 to a rendering component 118 of the computing device(s) 110.

The rendering component 118 can be configured to receive the output 116 and render a frame of the user interface based, at least in part, on the output 116. For example, the rendering component 118 can obtain data 120 (e.g., geographic mapping data, geometries, textures) from the provider system 104 based, at least in part, on the output 116, which can indicate the view, orientation, position, location, etc. of the virtual camera 114 to be presented in the user interface. The rendering component 118 can render a frame of the user interface based, at least in part, on the data 120. In this way, the virtual camera 114 can be manipulated to view, for example, the spherical three-dimensional model of the Earth from different perspectives.

Figure 2A:
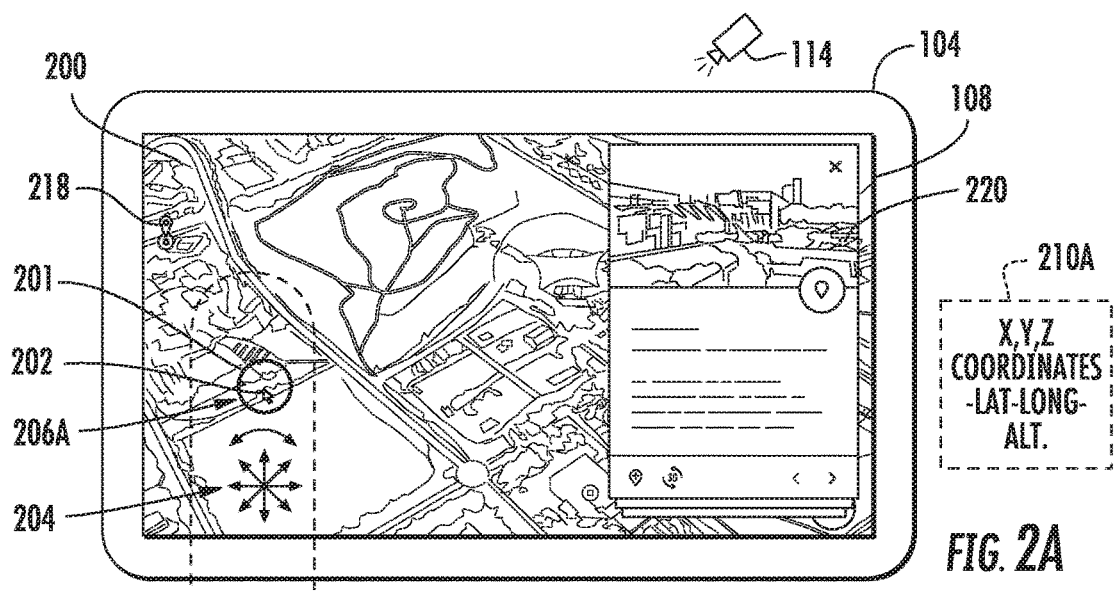
FIGS. 2A-C depict example user interfaces according to example embodiments of the present disclosure.

By way of example, as shown in FIG. 2A, the computing device(s) 110 can present a user interface 200 via the display device 108 of the user device 104. As shown, the user interface 200 can present a rendered version of a three-dimensional geographic map interface. The user interface 200 can be presented on the display device 108 using any suitable rendering techniques. For instance, the provider system 102 can obtain (e.g., from database 106) and transmit data 120 (e.g., geographic map data) corresponding to a specified location to the user device 104 (e.g., the rendering component 118). In some implementations, an application programming interface can request data associated with a specified location (e.g., based on location coordinates, other identifiers) from the provider system 102 and/or the database 106. In some implementations, the data 120 can include vector data, raster data partitioned into "tiles" of a fixed size, a combination of vector data and raster data, and/or in any other suitable format. Moreover, in some implementations, the data 120 can allow for generating a two-dimensional map and/or a three-dimensional map (e.g., vertices defining a mesh and textures). A software application operating on the user device 104 (e.g., associated with the rendering component) can render and display the user interface 200 for a specified location based, at least in part, on the data.

Returning to FIG. 1, the computing device(s) 104 can include various other components 122. For example, the user device 104 can include one or more of a cycle-detection component, search component, interesting places (e.g., cards) component, compass component, etc. The computing device(s) 110 can generate events for these components to react upon, such as to implement actions associated with a user interface, as further described herein.

The computing device(s) 110 can be configured to detect a shake event associated with a user interface. For instance, the computing device(s) 110 can receive data 124 indicative of a user input directed to causing a motion of a virtual camera 114 associated with a user interface. As shown, in FIGS. 2A-C, a user input 201 can be directed to grabbing and dragging the user interface 200 (e.g., via a cursor 202) to cause motion of the virtual camera 114. The computing device(s) 110 can identify one or more virtual camera manipulation pattern(s) 204 associated with the virtual camera 114 based, at least in part, on the user input 201. The manipulation pattern(s) 204 can be caused by the user input 201 directed to the cursor 202 displayed on the user interface 200.

The computing device(s) 110 can detect a shake event associated with the user interface 200 based, at least in part, on the virtual camera manipulation pattern(s) 204. By way of example, a user 113 can provide a user input 201 directed to the cursor 202 displayed on the user interface 200. The user input 201 can be a grab-and-drag of the user interface 200 to move the virtual camera 114. The user 113 can move the user interface in a particular manipulation pattern to cause a shake event. For instance, the user input 201 can move the user interface 200 (e.g., via the cursor grab) in a side-to-side, up-and-down, and/or circular motion to "shake" the virtual camera 114.

Figure 2B:
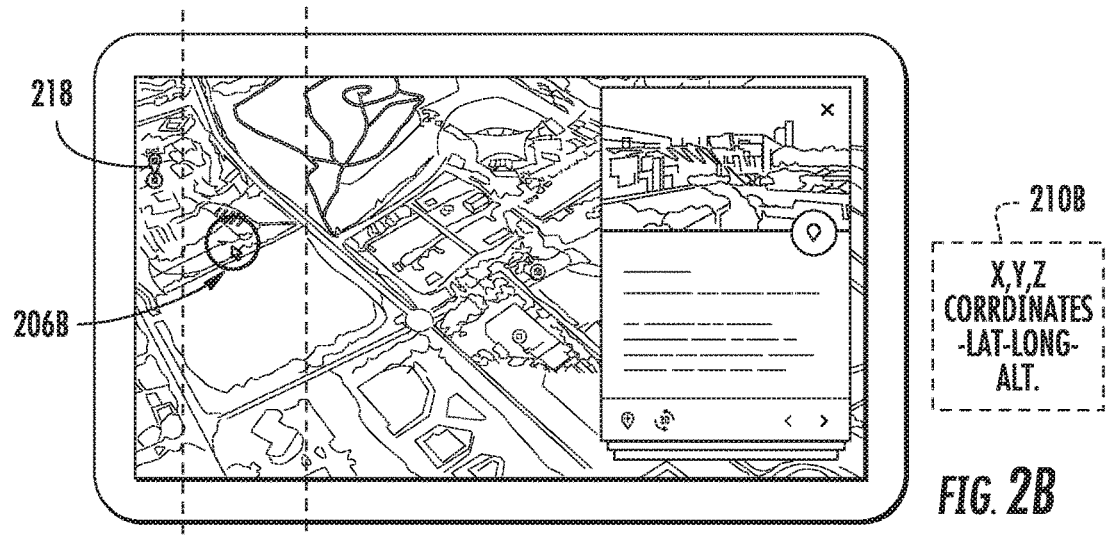
Figure 2C:
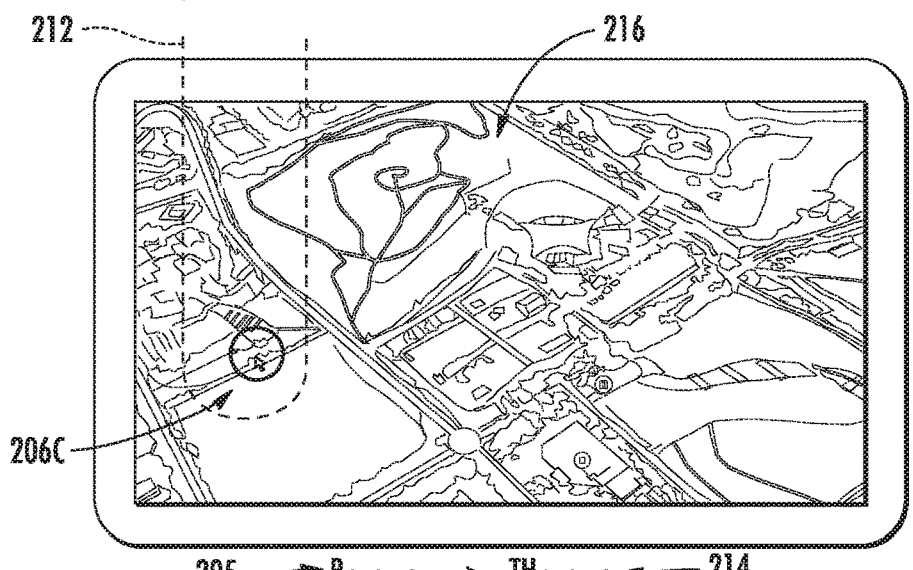

In some implementations, the computing device(s) 102 can identify the one or more virtual camera manipulation pattern(s) 204 by determining the occurrence of a plurality of cycles 205 associated with the motion of the virtual camera 114. A cycle can include, for instance, a manipulation pattern by which the virtual camera is moved away from an initial position and back to a position that is the same as, substantially similar to, or generally similar to the initial position. For example, the virtual camera 114 can be in a first position 206A (e.g., as shown in FIG. 2A) and one or more second position(s) 206B-C (e.g., as shown in FIGS. 2B-C). The first position 206A can be associated with an initial position of the virtual camera 114 when the motion of the virtual camera 114 starts. The one or more second position(s) 206B-C can be associated with a subsequent position of the virtual camera 114 that occurs after the first position. As shown in FIG. 2C, at least one of the second position(s) (e.g., 206C) can be substantially similar to the first position 206A, indicating that the virtual camera is being shaken (e.g., back and forth).

To detect a shake event, the computing device(s) 110 can compare parameter(s) associated with the virtual camera 114 at the various positions. For instance, when the motion of the virtual camera 114 starts, the computing device(s) 110 can identify, record, and/or store one or more first parameter(s) 210A associated with the virtual camera 114 at the first position 206A. The first parameter(s) 210A can include positional information (e.g., x-y-z coordinates, latitude-longitude-altitude, virtual distance) associated with the virtual camera 114 when at the first position 206A. The computing device(s) 110 can identify one or more second parameter(s) 210B associated with the virtual camera 114 at a second position 206B-C. The second parameter(s) 210B can include positional information (e.g., x-y-z coordinates, latitude-longitude-altitude, virtual distance) associated with the virtual camera 114, when the virtual camera 114 is at one or more of the second position(s) 206B-C. The computing device(s) 110 can determine the occurrence of a respective cycle 212 (e.g., from positions 206A to 206B to 206C) based, at least in part, on a comparison of the first parameter(s) 210A to the second parameter(s) 210B, as will be further described with reference to FIG. 7. This can allow the user device 104 to determine if the virtual camera 114 is moving in a manner away from and/or that returns the virtual camera 114 to its initial position (e.g., 206A), which can be indicative of a cycle 212. The computing device(s) 110 can repeat this process, for example, to detect a plurality of cycles 205.

The computing device(s) 110 can be configured to detect a shake event 216 based, at least in part, on the plurality of cycles 205. For instance, the computing device(s) 110 can compare the plurality of cycles 205 (e.g., the number of cycles) to a threshold level of cycles 214 that is indicative of a shake event 216. The computing device(s) 110 can detect the shake event 216 based, at least in part, on the plurality of cycles 205 exceeding the threshold level of cycles 214. The threshold 214 can be set such that inadvertent movements of the virtual camera 114 (e.g., during a bumpy train ride) will not be detected as a shake event. In this way, the shake event 216 is detected based, at least in part, on the movement of the virtual camera 114. The shake event 216 is detected without the use of physical motion sensors (e.g., accelerometers), that may be included in the user device 104.

The computing device(s) 110 can be configured to perform an action associated with a user interface based, at least in part, on the detected shake event. For instance, a user interface can include a display area for presenting visual content. In some implementations, a user interface can include one or more element(s) that are overlaid (or appear to be overlaid) the visual content. The computing device(s) 110 can remove one or more of the element(s) from the user interface based, at least in part, on the detected shake event 216. The removal can be performed such that the elements are hidden from view, are no longer visible, etc. to the user 113.

By way of example, the user interface 200 can present a geographic map interface, as shown in FIGS. 2A-C. One or more icon(s) 218 can be presented in the user interface 200 (e.g., overlaid the geographic map). The icon(s) 218 can, for example, indicate a geographic point of interest for the user 113. Additionally, and/or alternatively, an information card 220 (e.g., presented in a subscreen smaller than the display area and overlaid the geographic map) can be presented in the user interface 200. The computing device(s) 110 can remove the one or more icon(s) 218 and/or the information card 220 presented in the user interface 200 based, at least in part, on the detected shake event 216. In this way, the computing device(s) 110 can be configured to perform an action that is intuitive of the user 113 creating a shake event (e.g., the removal of elements).

Figure 3A:
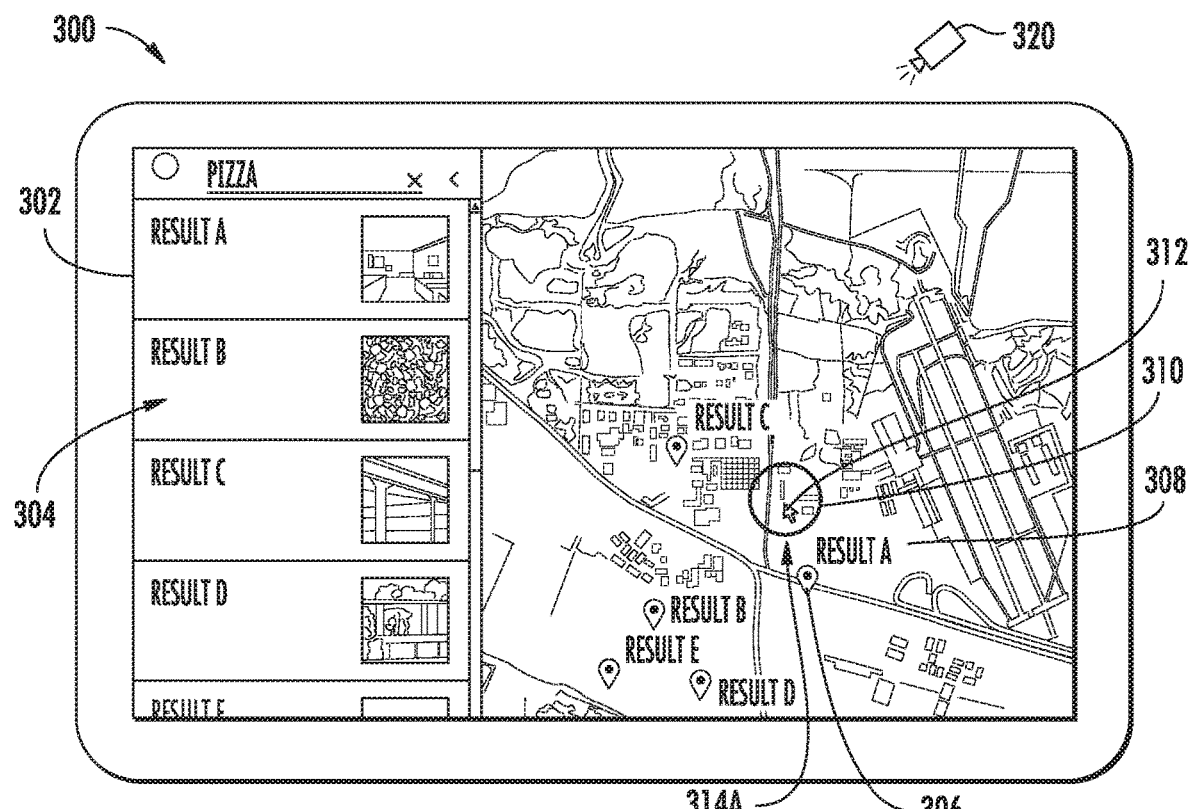
FIGS. 3A-C depict example user interfaces according to example embodiments of the present disclosure.
Figure 3B:
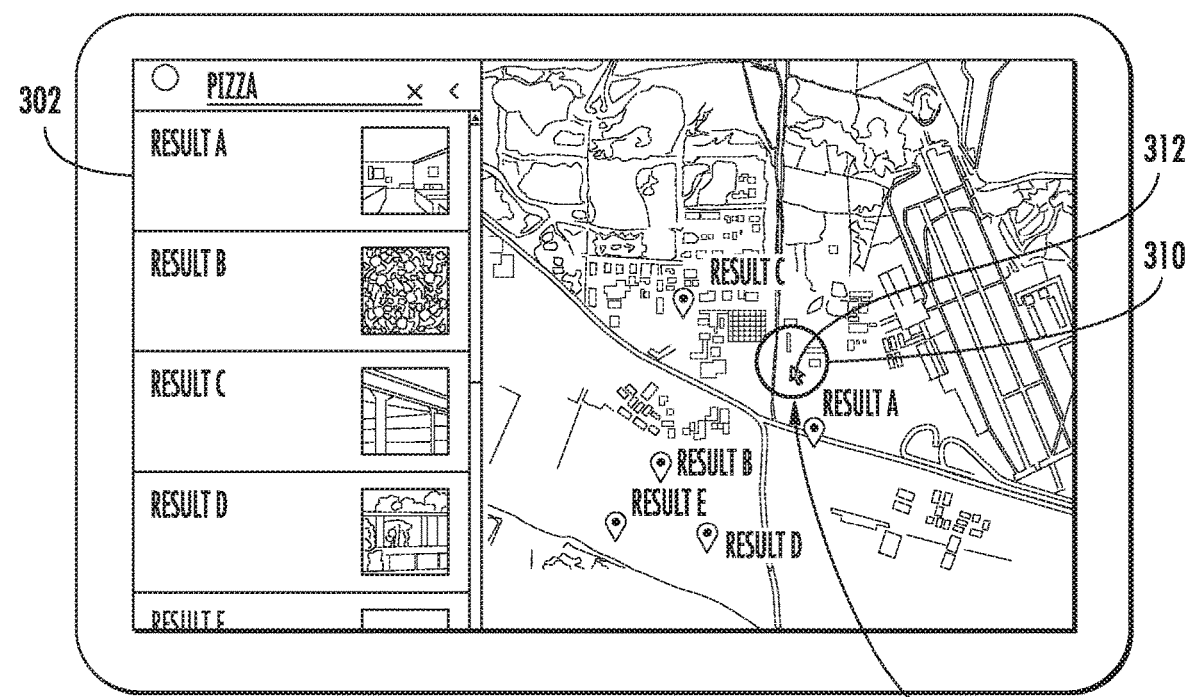
Figure 3C:
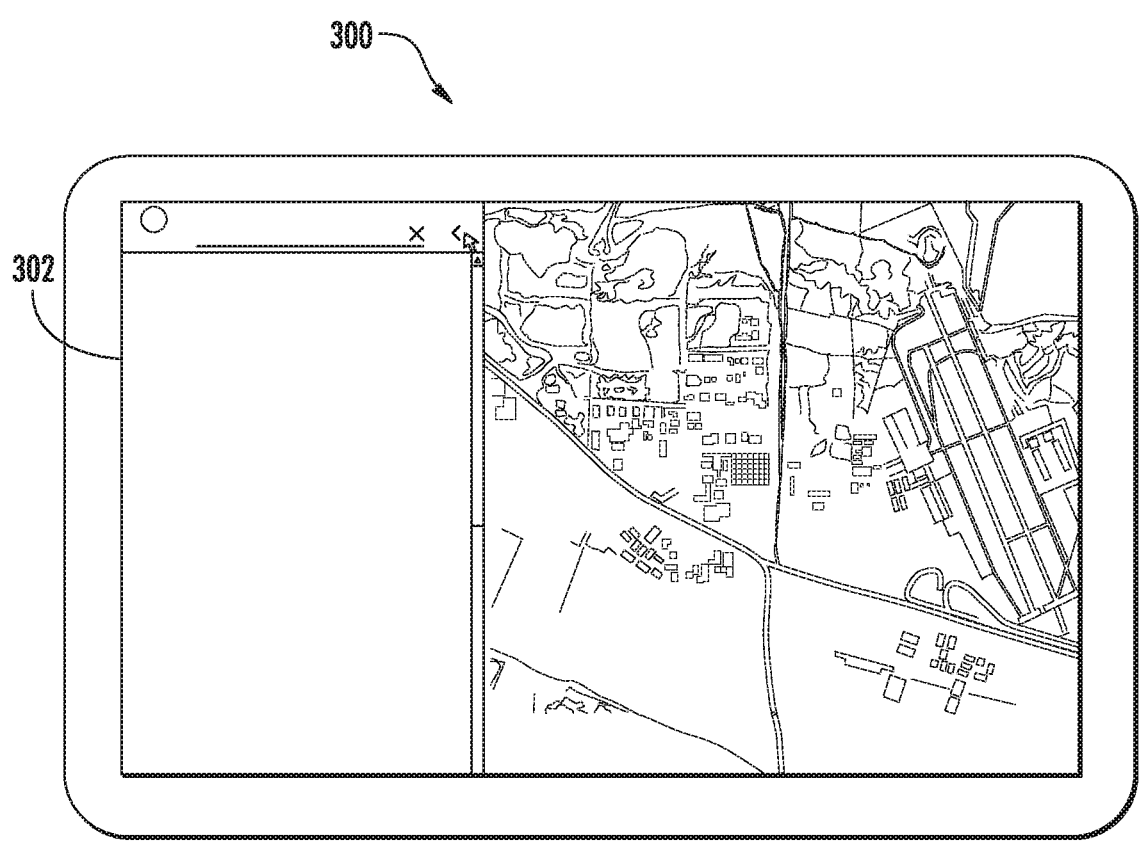

Additionally, and/or alternatively, the computing device(s) 110 can remove one or more search result(s) presented via a user interface based, at least in part, on a detected shake event. FIGS. 3A-C depict an example user interface 300 according to example embodiments of the present disclosure. A user 113 can search via a search prompt 302 presented on the user interface 300. For example, the user 113 can search for a particular location and/or a type of location (e.g., pizza restaurants). The prompt 302 can display the search results that are returned for the user's requested search terms and/or phrases. Moreover, in the event that the user interface 300 presents a geographic map interface (e.g., as shown in FIGS. 3A-C), one or more icon(s) 306 and/or label(s) 308 indicative of the search results 304 (e.g., locations, names of places, etc. included in the search results) can be presented on the user interface 300.

The user 113 may desire to clear the search results. To do so, the user 113 can provide a user input 310 directed to causing motion of the virtual camera 320 associated with the user interface 300 in order to cause a shake event. For instance, the user 113 can use a cursor 312 to "shake" the virtual camera 320 (e.g., from a plurality of positions 314A-B) to cause a plurality of cycles. The computing device(s) 110 can detect the shake event based, at least in part, on the plurality of cycles and perform an action associated with the user interface 300. For example, as shown in FIG. 3C, the computing device(s) 110 can remove one or more search result(s) 304 presented via the user interface 300 (e.g., a search results subscreen). This can cause the search prompt 302 to clear, become available for another search, and/or hide from view. Additionally, and/or alternatively, the computing device(s) 110 can remove one or more of the icon(s) 306 and/or label(s) 308 indicative of the search results 304 from the user interface 300 (e.g., as shown in FIG. 3C).

Figure 4A:
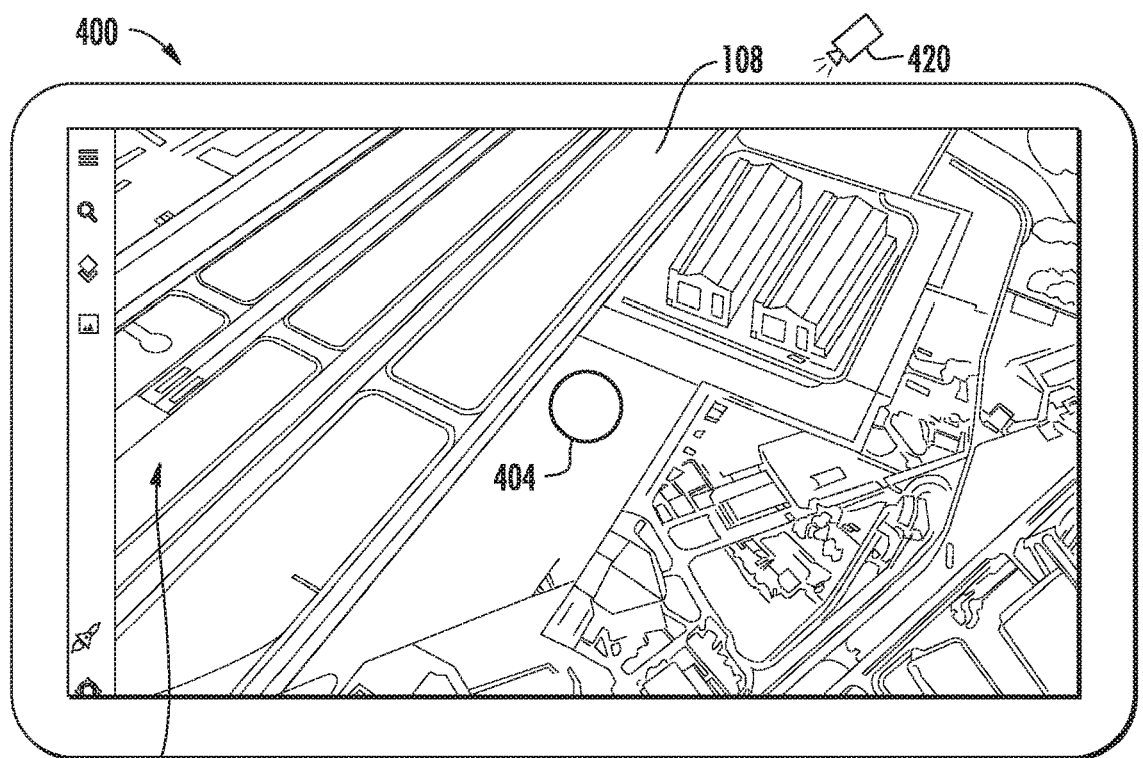
FIGS. 4A-C depict example user interfaces according to example embodiments of the present disclosure.
Figure 4B:
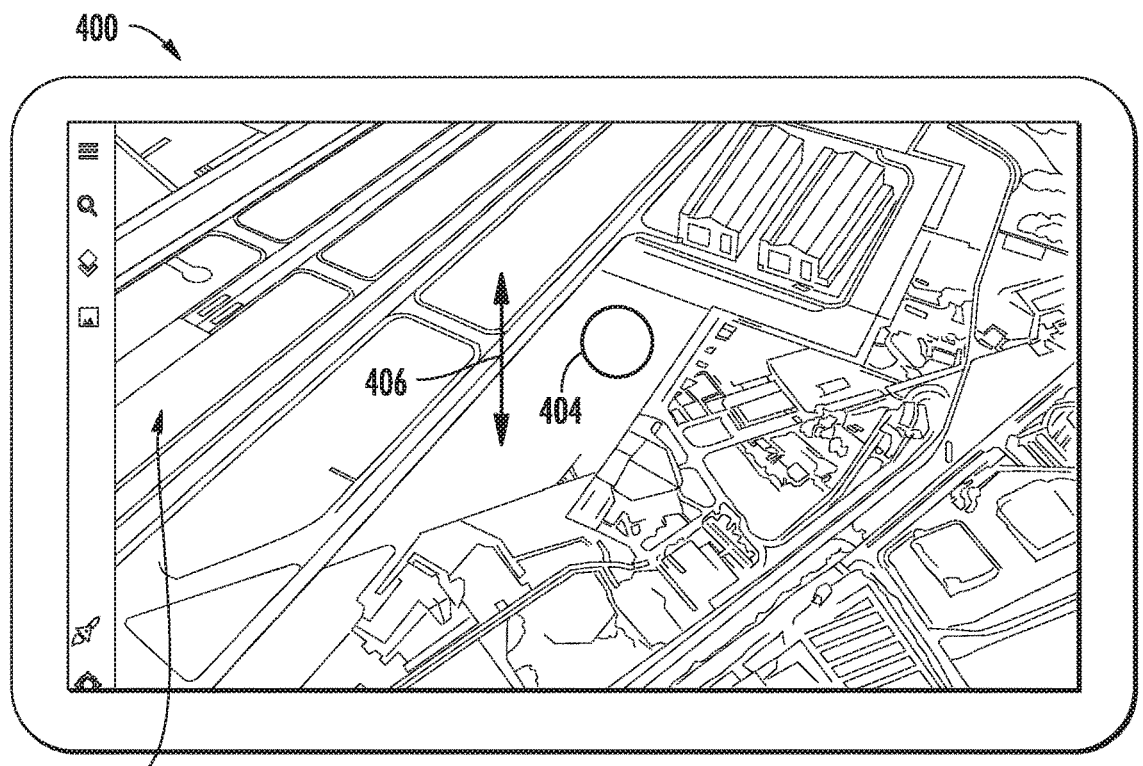
Figure 4C:
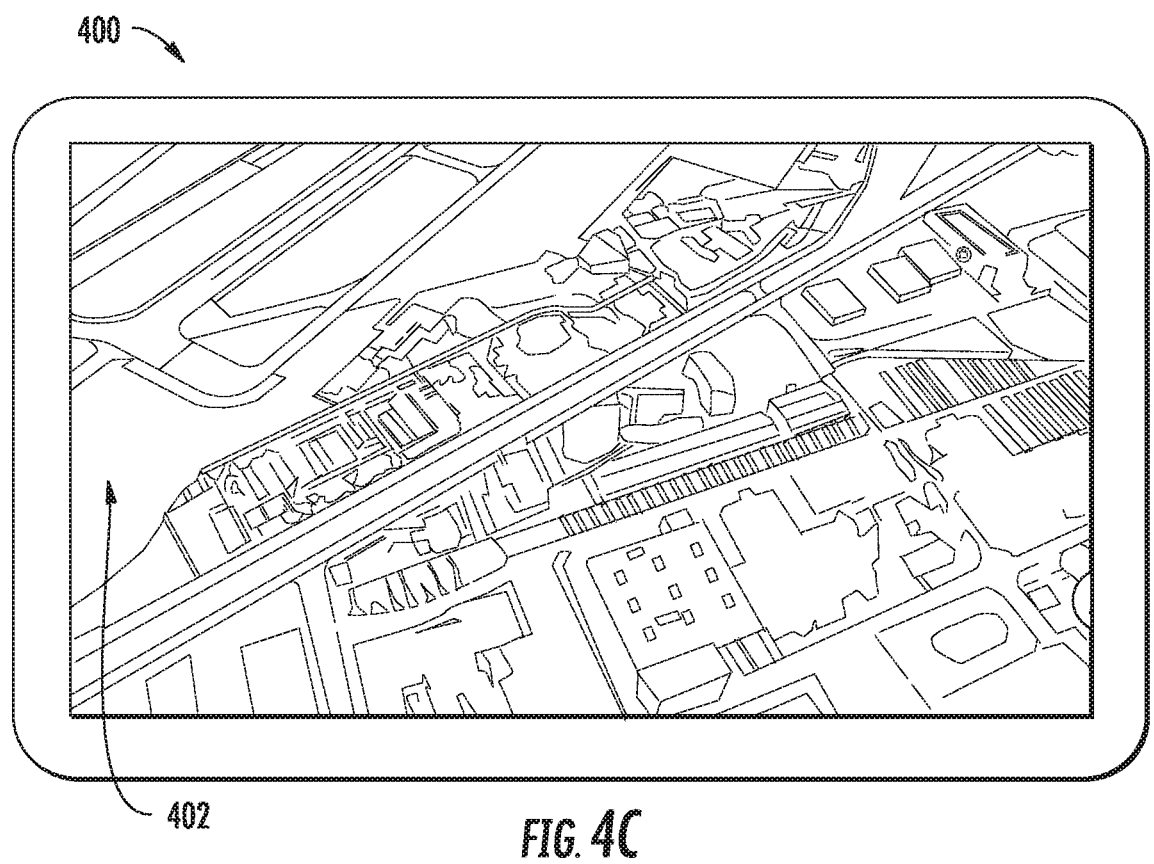

Additionally, and/or alternatively, the computing device(s) 110 can adjust the size of the user interface 300 based, at least in part, on a shake event. For example, FIGS. 4A-C depict an example user interface 400 according to example embodiments of the present disclosure. The user interface 400 can include a display area 402 for displaying visual content. As shown in FIGS. 4A-B, the display area 402 can be presented in a first size (e.g., that is less than a full screen size of the display device 108). The user 113 can provide a user input 404 (e.g., via a touch interaction) directed to causing motion of a virtual camera 420 associated with the user interface 400. The user input 404 can cause one or more virtual camera manipulation pattern(s) 406 (e.g., an up-and-down motion). The computing device(s) 110 can identify one or more virtual camera manipulation pattern(s) 406 associated with the virtual camera 412. The computing device(s) 110 can detect a shake event based, at least in part, on the one or more virtual camera manipulation pattern(s) 406. The computing device(s) 110 can adjust (e.g., shrink, expand) a size, orientation, position, etc. of the user interface 400 based, at least in part, on the shake event. The computing device(s) 110 can adjust the user interface 400 to a second size. For example, the computing device(s) 110 can expand the display area 402 to a full screen size, as shown in FIG. 4C based, at least in part, on the shake event caused by the user input 404.

Figure 5:
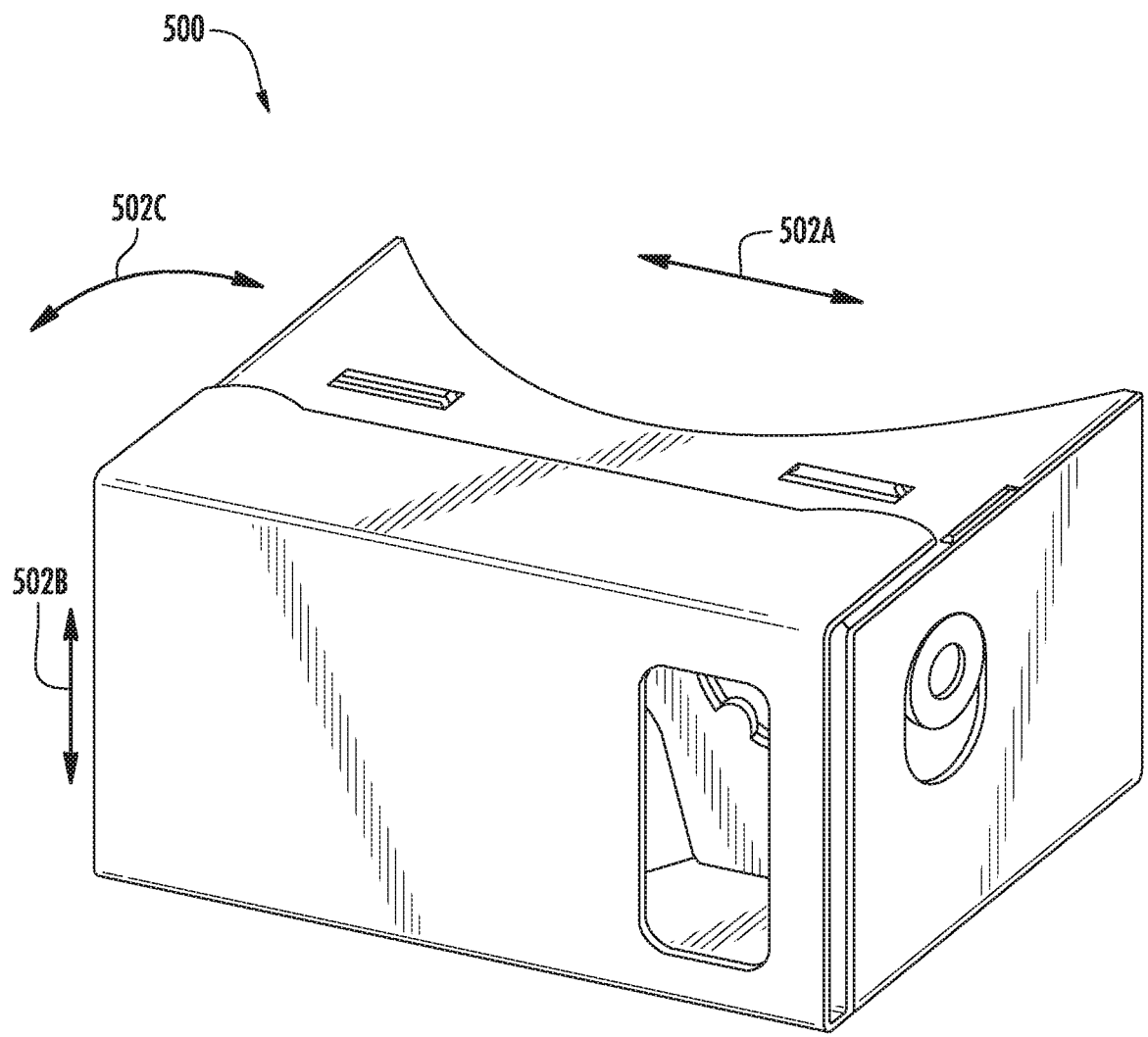
FIG. 5 depicts an example virtual reality system according to example embodiments of the present disclosure.

In some implementations, the user input can be provided via movement of a virtual reality system. FIG. 5 depicts an example virtual reality system 500 according to example embodiments of the present disclosure. The user device 104 can be, include, and/or otherwise be associated with the virtual reality system 500. The virtual reality system 500 can be configured to implement a user interface such as a three-dimensional geographic interface and/or other types of user interfaces. In some implementations, a user interface can be associated with an augmented reality implemented using the virtual reality system 500. Moreover, in some implementations, the virtual camera associated with a user interface implemented by the virtual reality system 500 can be associated with an augmented reality. In a manner similar to that described above, one or more computing device(s) associated with the virtual reality system 500 can receive data indicative of a user input directed to causing a motion of a virtual camera associated with a user interface of the virtual reality system 500. The user input can cause the associated virtual camera to be moved in one or more virtual camera manipulation pattern(s) 502A-C (e.g., causing a plurality of cycles). The computing device(s) associated with the virtual reality system 500 can detect a shake event based, at least in part, on the one or more virtual camera manipulation pattern(s) 502A-C (and/or the plurality of cycles).

The computing device(s) associated with the virtual reality system 500 can be configured to perform an action associated with a user interface based, at least in part, on the detected shake event. For instance, the one or more manipulation pattern(s) 502A-C can be based, at least in part, on an intuitive movement by a user 113. For example, in some implementations, the user input can be directed to moving the virtual camera in an up-and-down manner (e.g., 502B), similar to a physical "yes" shake of the user's head, to cause a shake event (e.g., via movement of the virtual camera). The computing device(s) associated with the virtual reality system 500 can detect the shake event and can perform an action, such as, a confirmatory action. The confirmatory action can include, for instance, the confirmation of search results, obtaining information associated with a particular location (e.g., presenting an information card), confirming a question presented in the user interface, other actions within an augmented reality, etc. In some implementations, the user input can be directed to moving the virtual camera in a side-to-side manner (e.g., 502B), similar to a physical "no" shake of the user's head, to cause a shake event. The computing device(s) associated with the virtual reality system 500 can detect the shake event and can perform an action, such as, a refuting and/or dismissing action. For example, the computing device(s) of the virtual reality system 500 can remove one or more search result(s), icon(s), label(s), etc., deny and/or dismiss a question and/or a suggestion presented on the user interface, etc. As such, the virtual reality system 500 can perform actions that may be intuitive and/or familiar to the user 113 based, at least in part, on the type of manipulation pattern (e.g., 502A-C) of the virtual camera.

Figure 6:
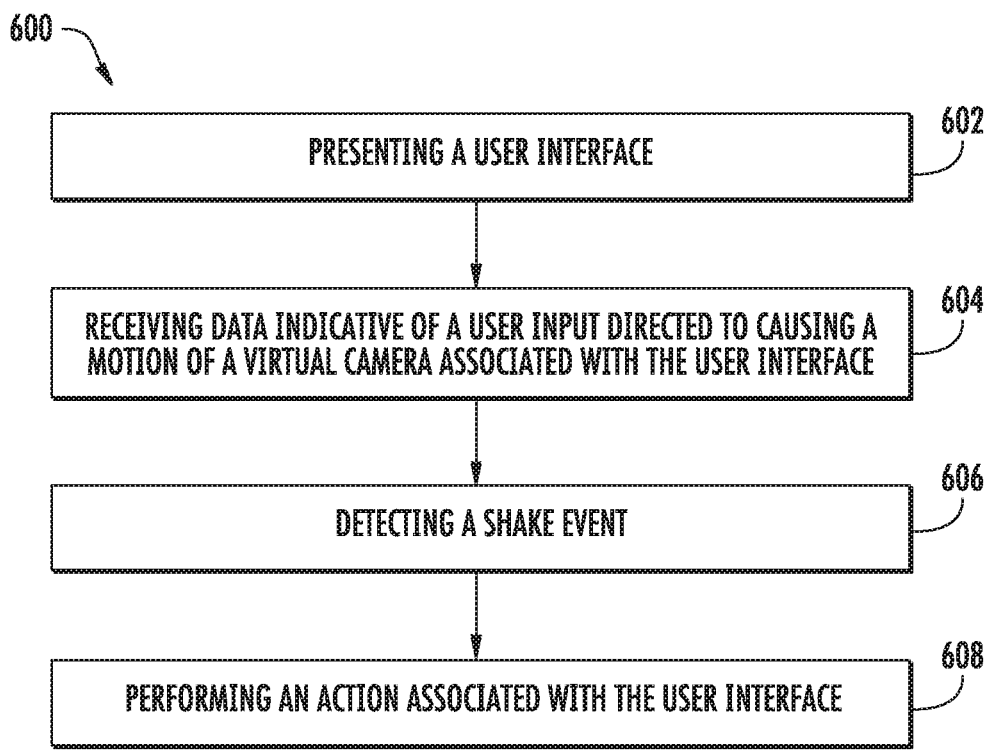
FIG. 6 depicts a flow diagram of an example method according to example embodiments of the present disclosure.

FIG. 6 depicts a flow diagram of one example method 600 of performing a user interface action according to example embodiments of the present disclosure. The method 600 can be implemented using, for instance, one or more computing device(s) such as those described in FIGS. 1 and 8. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At (602), the method can include presenting a user interface. For instance, the computing device(s) 110 can present a user interface (e.g., 200, 300, 400) via a display device 108 of the user device 104. In some implementations, the user interface can present a geographic map interface and/or a rendered version of a three-dimensional geographic map interface, as described herein. A user 113 can navigate the user interface (e.g., the three-dimensional environment presented by the user interface) to display different data (e.g., views within the three-dimensional environment). As indicated above, the user interface (e.g., 200, 300, 400) can be associated with a virtual camera (e.g., 112, 320, 420) that can define, at least in part, what data to display via the user interface. The virtual camera can have a perspective according to its position and/or orientation. By changing the position, orientation, zoom, etc. of the virtual camera (e.g., 112, 320, 420), a user 113 can navigate through the environment presented by the user interface.

At (604), the method can include receiving data indicative of a user input directed to causing a motion of a virtual camera associated with the user interface. For instance, the computing device(s) 110 can receive data 124 indicative of a user input 201 directed to causing a motion of a virtual camera 114 associated with a user interface 200. As described herein, the user input can include a cursor interaction, a touch interaction, and/or other types of interactions with the user interface. By way of example, a user 113 can grab and drag the user interface 200 (e.g., its display area) via a cursor 202 to manipulate the motion of the virtual camera 114 to show different areas (e.g., geographic areas) within the user interface 200. In some implementations, the user input can be provided via movement of a virtual reality system 500, as described herein.

At (606), the method can include detecting a shake event. For instance, the computing device(s) 110 can detect a shake event (e.g., 216) associated with the user interface 200 based, at least in part, on the motion of the virtual camera 114. The shake event (e.g., 216) can be detected, by the computing device(s) 110, without the use of physical motion sensors. For example, the computing device(s) 110 can identify one or more virtual camera manipulation pattern(s) 204 associated with the virtual camera 114. The computing device(s) 110 can detect a shake event (e.g., 216) based, at least in part, on one or more of the manipulation pattern(s) 204.

Figure 7:
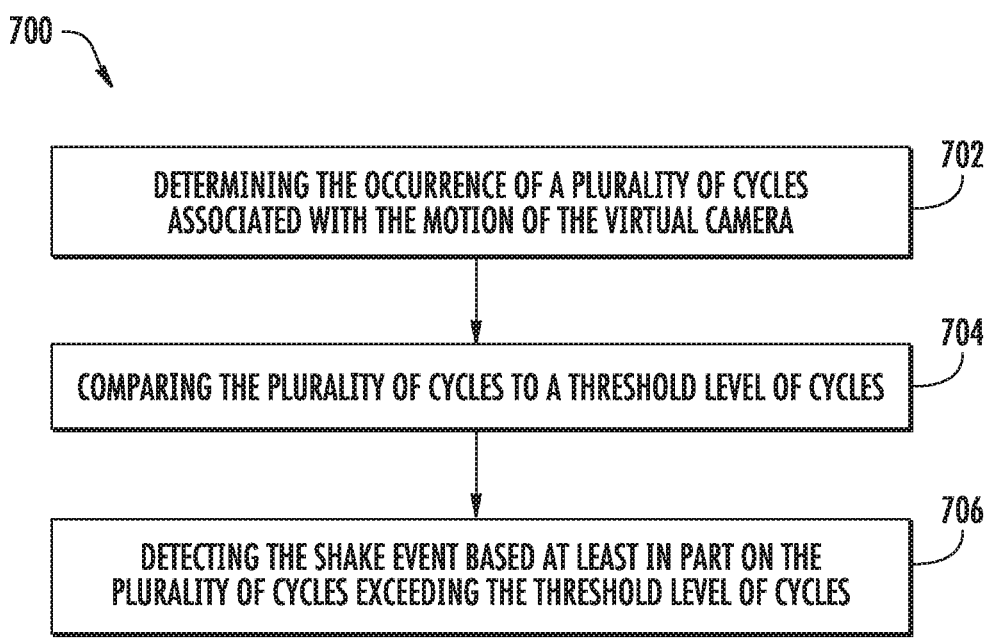
FIG. 7 depicts a flow diagram of an example method according to example embodiments of the present disclosure.

FIG. 7 depicts a flow diagram of one example method 700 of detecting a shake event according to example embodiments of the present disclosure. The method 700 can be implemented using, for instance, one or more computing device(s) such as those described in FIGS. 1 and 8. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At (702), the method 700 can include determining the occurrence of a plurality of cycles associated with the motion of the virtual camera. For instance, the computing device(s) 110 can determine the occurrence of a plurality of cycles 205 associated with the motion of the virtual camera 114. To determine a respective cycle, the computing device(s) 110 can identify one or more first parameter(s) 210A associated with a virtual camera 114 at a first position 208A. The first position 208A can be associated with an initial position of the virtual camera 114 when the motion of the virtual camera 114 starts (e.g., when the user input 201 starts to move the virtual camera). The computing device(s) 110 can identify one or more second parameter(s) 210B associated with the virtual camera 114 at a second position 208B. The second position 208B can be associated with a subsequent position of the virtual camera 114 that occurs after (e.g., in time) the first position 208A. The computing device(s) 110 can determine the occurrence of the respective cycle (e.g., 212) based, at least in part, on a comparison of the first parameter(s) 210A to the second parameter(s) 210B. In some implementations, the manipulation pattern (and/or motion path) associated with the respective cycle need not necessarily be perfectly linear and/or circular, as long as the movement of the virtual camera 114 appears like a "shaking" of the virtual camera 114, the computing device(s) 110 can detect the shake event.

Moreover, the computing device(s) 110 can validate the respective cycle, such that a cycle is not detected for movements of the virtual camera 114 that are not associated with a shake event (e.g., an inadvertent movement caused by a bumpy train ride, slow navigation movement of the user interface). For instance, the computing device(s) 110 can impose one or more frequency bound(s) and/or threshold(s) on the periodicity detected by the movement of the virtual camera 114 (e.g., as indicated by the parameter(s) 210A-B). In some cases, these bound(s) and/or threshold(s) can be selected empirically and/or tested by users.

By way of example, to detect a cycle, the computing device(s) 110 can identify, record, store, etc. one or more first parameter(s) 110A (e.g., x-y-z coordinates, latitude-longitude-altitude) when the user input 201 starts to move the virtual camera 114 (e.g., a start moving event is triggered). Before the computing device(s) 110 determine that the motion of the virtual camera 114 has stopped (e.g., before a stop moving event is detected), the computing device(s) 110 (e.g., via a cycle-detection component) can identify the second parameters 210B (e.g., x-y-z coordinates, latitude-longitude-altitude) associated with the virtual camera 114 at one or more second position(s) (e.g., 208B). The computing device(s) 110 can compare the first parameter(s) 210A to the second parameter(s) 210B to detect a cycle. For example, if the Euclidean distance between the first and second parameter(s) fall short of a distance threshold, it can be considered a detected cycle. In some implementations, the computing device(s) 110 may only consider a respective cycle to be detected if it also has a large enough span (e.g., a small distance cannot trigger a valid cycle). Once the cycle is validated, the computing device(s) 110 can clear the recorded virtual camera history (e.g., the identified parameters) and try to detect new, subsequent cycles (e.g., via a cycle-detection component). The computing device(s) 110 can repeat this detection process to detect a plurality of cycles 205. In some implementations, the computing device(s) 110 can require subsequent cycles to fall within a similar time period and/or frequency of one or more previously detected (and/or validated) cycle(s). In this way, the variation of frequency can be contained among the detected cycles.

At (704), the method can include comparing the plurality of cycles to a threshold level of cycles. For instance, the computing device(s) 110 can compare the plurality of cycles 205 (e.g., the number of cycles in the plurality) to a threshold level of cycle(s) 214. The threshold level of cycle(s) 214 can be indicative of the minimum number of detected cycles required to determine a shake event (e.g., 216). As indicated above, the threshold level of cycles 214 can be set such that inadvertent movements of the virtual camera (e.g., during a bumpy train ride) will not be detected as a shake event. At (706), the computing device(s) 110 can detect the shake event (e.g., 216) based, at least in part, on the plurality of cycles 205 exceeding the threshold level of cycles 214. In some implementations, the computing device(s) 110 may be configured to detect only one shake event at a time. Thus, when a shake event is detected, unless the virtual camera 114 stops moving and starts moving again, the computing device(s) 110 may simply no longer analyze and/or output new shake events.

Returning to FIG. 6, at (608), the method can include performing an action associated with the user interface. For example, the computing device(s) 110 can perform an action associated with the user interface 200 based, at least in part, on the detected shake event 216. To do so, in some implementations, the camera component 112 of the computing device(s) 110 can generate and provide an output (e.g., 116) that is indicative of the shake event to one or more of the other component(s) (e.g., rendering component 112, other components 122). The other components can use the output (e.g., 116) to perform an action based, at least in part, on the detected shake event. By way of example, the action can include removing one or more icon(s) 218 presented in the user interface 200 based, at least in part, on the detected shake event 216 (e.g., as shown in FIGS. 2A-C). In some implementations, the action can include removing one or more search result(s) 304 (e.g., as shown in FIGS. 3A-C), adjusting a size associated with the user interface (e.g., as shown in FIGS. 4A-C), and/or other actions associated with a user interface.

While the user interface actions are often described herein as being performed by the computing device(s) 110 of the user device, one of ordinary skill in the art would understand that this is not meant to be limiting. One or more of the operation(s) and function(s) described herein as being performed by the computing device(s) of the user device 104 can be performed by the provider system 102. For example, in the event that the user interfaces are accessed via a web-based application, the provider system 102 can receive data indicative of user input, detect a shake event, perform actions associated with a user interface, etc. as described herein. Moreover, in some implementations, the provider system 102 can provide a user interface for display on a display device 108 (e.g., of the user device 104).

Figure 8:
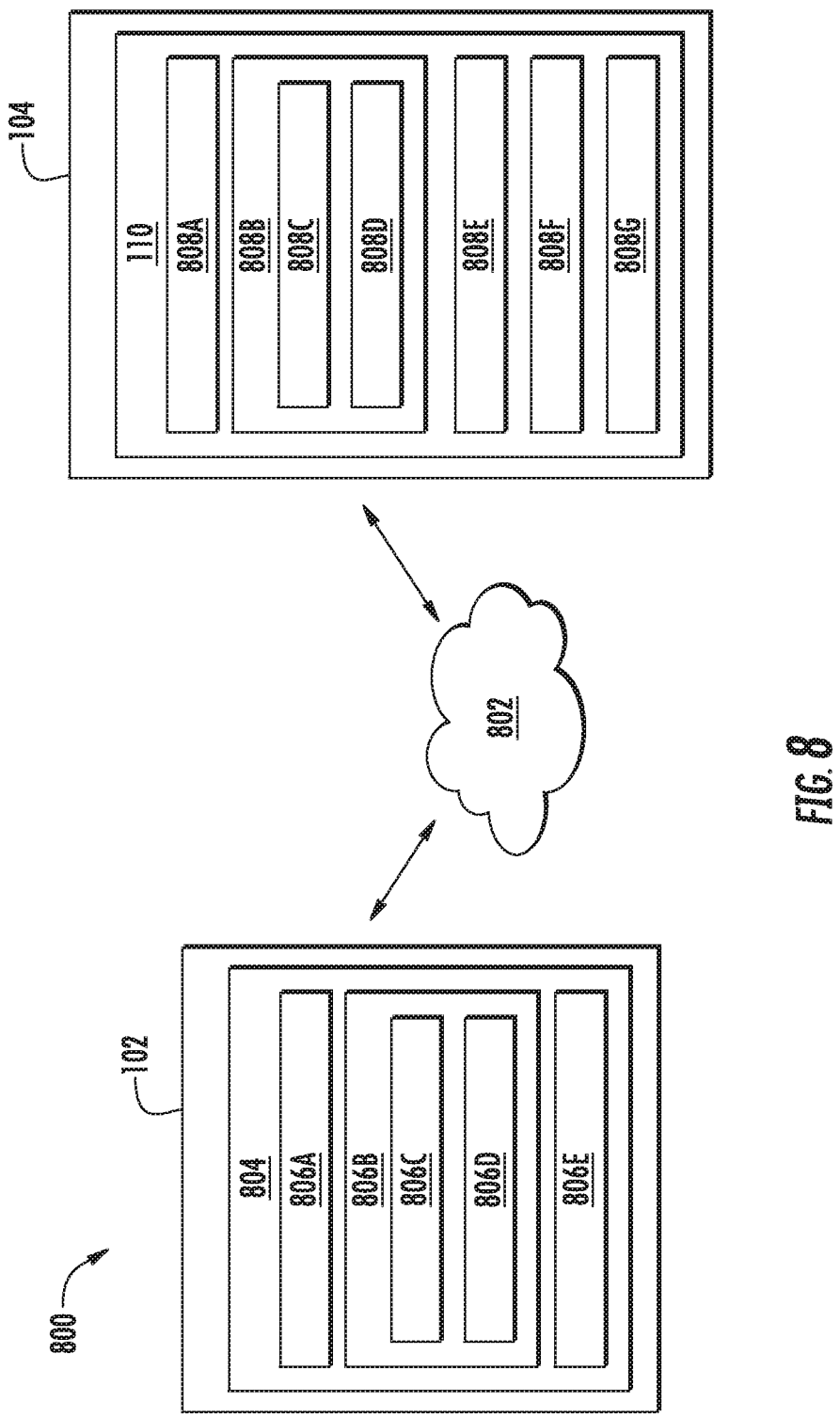
FIG. 8 depicts an example system according to example embodiments of the present disclosure.

FIG. 8 depicts an example system 800 according to example embodiments of the present disclosure. The system 800 can be implemented using a client-server architecture that includes the provider computing system 102 that communicates with one or more user device(s) 104 over one or more network(s) 802. The system 800 can be implemented using other suitable architectures, such as a single computing device.

The provider system 102 can include, for instance, a web server and/or a cloud-based server system. The provider system 102 can be implemented using any suitable computing device(s) 804. The computing device(s) 804 can include one or more processor(s) 806A and one or more memory device(s) 806B. The one or more processor(s) 806A can include any suitable processing device, such as a microprocessor, microcontroller, integrated circuit, an application specific integrated circuit (ASIC), a digital signal processor (DSP), a field-programmable gate array (FPGA), logic device, one or more central processing unit(s) (CPUs), graphics processing units (GPUs), processing units performing other specialized calculations, etc.

The one or more memory device(s) 806B can include one or more computer-readable media, including, but not limited to, non-transitory computer-readable media, RAM, ROM, hard drives, flash drives, or other memory devices. The one or more memory device(s) 806B can store information accessible by the one or more processor(s) 806A, including computer-readable instructions 806C that can be executed by the one or more processor(s) 806A. The instructions 806C can be any set of instructions that when executed by the one or more processor(s) 806A, cause the one or more processor(s) 806A to perform operations. In some embodiments, the instructions 806C can be executed by the one or more processor(s) 806A to cause the one or more processor(s) 806A to perform operations, such as any of the operations and functions for which the provider system 102 and/or the computing device(s) 804 are configured, the operations for performing a user interface action and/or detecting a shake event (e.g., methods 600, 700), and/or any other operations or functions, as described herein. The instructions 806C can be software written in any suitable programming language or can be implemented in hardware. Additionally, and/or alternatively, the instructions 806C can be executed in logically and/or virtually separate threads on processor(s) 806A.

The one or more memory device(s) 806B can also store data 806D that can be retrieved, manipulated, created, or stored by the one or more processor(s) 806A. The data 806D can include, for instance, geographic mapping data, data associated with a user interface, and/or other data or information. For instance, the data 806D can include map-related information, at least a portion of which may be transmitted to a user device. For example, data 806D can include map tiles where each tile is a map image of a particular geographic area/location. Depending on the resolution (e.g., whether the map is zoomed in or out), one tile may cover an entire region such as a state in relatively little detail. Another tile may cover just a few elements (e.g., streets) in high detail. The map information is not limited to any particular format. For example, the images may comprise street maps, satellite images, or a combination of these, and may be stored as vectors (particularly with respect to street maps) or bitmaps (particularly with respect to satellite images). The various map tiles can each be associated with geographical locations, such that the computing device(s) 804 are capable of selecting, retrieving and transmitting one or more tiles in response to receipt of a user input and/or location.

The data 806D can be stored in one or more database(s) (e.g., database 106). The one or more database(s) can be connected to the computing device(s) 804 by a high bandwidth LAN or WAN, and/or can be connected to computing device(s) 804 through network(s) 802. The one or more database(s) can be split up so that they are located in multiple locales.

The computing device(s) 804 can also include a network interface 806E used to communicate with one or more other component(s) of the system 800 (e.g., user device 104) over the network(s) 802. The network interface 806E can include any suitable components for interfacing with one more networks, including for example, transmitters, receivers, ports, controllers, antennas, or other suitable components.

The computing device(s) 804 can exchange data with one or more user device(s) 104 over the network(s) 802. Although one user device 104 is illustrated in FIG. 8 (and herein), any number of user devices 104 can be connected to computing device(s) 804 over the network(s) 802. Each of the user devices 104 can be any suitable type of computing device, such as a general purpose computer, special purpose computer, laptop, desktop, mobile device, navigation system, smartphone, tablet, wearable computing device, a display with one or more processors, and/or other suitable computing device, as described herein.

The user device 104 can include one or more computing device(s) 110. The one or more computing device(s) 110 can include one or more processor(s) 808A and one or more memory device(s) 808B. The one or more processor(s) 808A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc.

The memory device(s) 808B can include one or more computer-readable media and can store information accessible by the one or more processor(s) 808A, including instructions 808C that can be executed by the one or more processor(s) 808A and data 808D. For instance, the memory device(s) 808B can store instructions 808C for implementing a camera system component, rendering system component, a user interface component, etc. for displaying a user interface according to example aspects of the present disclosure. In some embodiments, the instructions 808C can be executed by the one or more processor(s) 808A to cause the one or more processor(s) 808A to perform operations, such as any of the operations and functions for which the user device 104 and/or the computing device(s) 110 are configured, the operations for performing a user interface action and/or detecting a shake event (e.g., methods 600, 700), and/or any other operations or functions for providing a user interface, receiving user input, detecting a shake event, and performing an action associated with the user interface, as described herein. The instructions 808C can be software written in any suitable programming language or can be implemented in hardware. Additionally, and/or alternatively, the instructions 808C can be executed in logically and/or virtually separate threads on processor(s) 808A.

The data 808D can be retrieved, manipulated, created, or stored by the one or more processor(s) 808A. The data 808D can include, for instance, data associated with user interfaces, user input, mapping data, a virtual camera, manipulation patterns, shake events, and/or other information. In some implementations, the data 808D can be received from another device (e.g., computing device(s) 804).

The user device 104 can include various input/output components 808E-F for providing and receiving information from a user. The input components 808E can include, for example, a mouse, trackball, a touch screen, touch pad, gyroscope, data entry keys, a microphone suitable for voice recognition, and/or any other suitable input device. The output components 808F can include the display device 108 for presenting a user interface according to example aspects of the present disclosure. The display device 108 can include, for example, a CRT, LCD, plasma screen, touch screen, TV, projector, and/or any other suitable display device.

The user device 104 can also include a network interface 808G used to communicate with one or more other component(s) of system 800 (e.g., provider system 102) over the network(s) 802. The network interface 808G can include any suitable components for interfacing with one more network(s), including for example, transmitters, receivers, ports, controllers, antennas, or other suitable components.

The one or more network(s) 802 can be any type of communications networks, such as a local area network (e.g. intranet), wide area network (e.g. Internet), cellular network, or some combination thereof. The network(s) 802 can also include a direct connection between a user device 104 and the provider system 102. In general, communication between provider system 102 and a user device 104 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at the provider system (e.g., a server) can instead be performed at a user device. Likewise, computing tasks discussed herein as being performed at the user device can instead be performed at the provider system (e.g., a server).

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of performing a user interface action, comprising:
    receiving, by one or more computing devices, data indicative of a user input to the user interface, wherein the user input is directed to causing a motion of a virtual camera associated with a user interface, wherein the virtual camera defines, at least in part, what data is displayed via the user interface;
    detecting, by the one or more computing devices, a shake event associated with the user interface based at least in part on an occurrence of a plurality of cycles associated with the motion of the virtual camera caused by the user input to the user interface; and
    performing, by the one or more computing devices, an action associated with the user interface based at least in part on the detected shake event.

2. The computer-implemented method of claim 1, wherein the shake event is detected without the use of physical motion sensors.

3. The computer-implemented method of claim 1, wherein detecting the shake event comprises:

identifying, by the one or more computing devices, one or more virtual camera manipulation patterns associated with the virtual camera.

4. The computer-implemented method of claim 1, wherein detecting the shake event comprises:
determining, by the one or more computing devices, the occurrence of the plurality of cycles associated with the motion of the virtual camera;
comparing, by the one or more computing devices, the plurality of cycles to a threshold level of cycles; and
detecting, by the one or more computing devices, the shake event based at least in part on the plurality of cycles exceeding the threshold level of cycles.

5. The computer-implemented method of claim 4, wherein a respective cycle of the plurality of cycles is determined by:
identifying, by the one or more computing devices, one or more first parameters associated with a virtual camera at a first position;
identifying, by the one or more computing devices, one or more second parameters associated with the virtual camera at a second position; and
determining, by the one or more computing devices, the occurrence of the respective cycle based at least in part on a comparison of the first parameters to the second parameters.

6. The computer-implemented method of claim 5, wherein the first position is associated with an initial position of the virtual camera when the motion of the virtual camera starts and the second position is associated with a subsequent position of the virtual camera that occurs after the first position.

7. The computer-implemented method of claim 1, wherein the user interface presents a geographic map interface.

8. The computer-implemented method of claim 7, wherein the action comprises:
removing, by the one or more computing devices, one or more icons presented in the user interface based at least in part on the detected shake event.

9. The computer-implemented method of claim 1, wherein the user input is provided via movement of a virtual reality system.

10. A computing system for performing a user interface action, comprising:
one or more processors; and
one or more memory devices, the one or more memory devices storing instructions that when executed by the one or more processors cause the one or more processors to perform operations, the operations comprising:
receiving data indicative of a user input directed to a user interface, wherein the user input is directed to causing a motion of a virtual camera associated with the user interface, wherein the virtual camera defines, at least in part, what data is displayed via the user interface;
identifying one or more virtual camera manipulation patterns associated with the virtual camera based at least in part on the user input, wherein the one or more virtual camera manipulation patterns comprise the occurrence of a plurality of cycles associated with the motion of the virtual camera caused by the user input to the user interface;
detecting a shake event associated with the user interface based at least in part on the virtual camera manipulation patterns; and
performing an action associated with the user interface based at least in part on the detected shake event.

11. The system of claim 10, wherein the one or more virtual camera manipulation patterns are caused by a user input directed to a cursor displayed on the user interface.

12. The system of claim 10, wherein identifying the one or more virtual camera manipulation patterns comprises:
determining the occurrence of the plurality of cycles associated with the motion of the virtual camera.

13. The system of claim 12, wherein a respective cycle of the plurality of cycles is determined by:
identifying one or more first parameters associated with the virtual camera at a first position;
identifying one or more second parameters associated with the virtual camera at a second position; and
determining the occurrence of the respective cycle based at least in part on a comparison of the first parameters to the second parameters.

14. The system of claim 12, wherein detecting the shake event comprises:
comparing the plurality of cycles to a threshold level of cycles; and
detecting the shake event based at least in part on the plurality of cycles exceeding the threshold level of cycles.

15. The system of claim 10, wherein the action comprises:
adjusting a size of the user interface based at least in part on the shake event.

16. A user device, comprising:
a display device;
one or more processors; and
one or more memory devices, the one or more memory devices storing instructions that when executed by the one or more processors cause the one or more processors to perform operations, the operations comprising:
presenting a user interface via the display device;
receiving data indicative of a user input directed to the user interface, wherein the user input is directed to causing a motion of a virtual camera associated with the user interface, wherein the virtual camera defines, at least in part, what data is displayed via the user interface;
detecting a shake event associated with the user interface based at least in part on an occurrence of a plurality of cycles associated with the motion of the virtual camera caused by the user input to the user interface; and
performing an action associated with the user interface based at least in part on the detected shake event.

17. The user device of claim 16, wherein the shake event is detected without the use of physical motion sensors.

18. The user device of claim 16, wherein the user interface presents a rendered version of a three-dimensional geographic map interface.

19. The user device of claim 16, wherein detecting the shake event comprises:
determining the occurrence of the plurality of cycles associated with the motion of the virtual camera.

20. The user device of claim 16, wherein the action comprises:
removing one or more search results presented via the user interface.

* * * * *